United States Patent
Griffiths et al.

(10) Patent No.: US 8,472,772 B2
(45) Date of Patent: Jun. 25, 2013

(54) CABLE LOOP DEVICE FOR OPTICAL SYSTEMS

(75) Inventors: Ian Griffiths, Eastleigh (GB); Paul Hubbard, Eastleigh (GB)

(73) Assignee: Prysmian Cables & Systems Limited, Hampshire (GB)

( * ) Notice: Subject to any disclaimer, the term of this patent is extended or adjusted under 35 U.S.C. 154(b) by 532 days.

(21) Appl. No.: 12/308,643

(22) PCT Filed: Jun. 22, 2006

(86) PCT No.: PCT/GB2006/002303
§ 371 (c)(1),
(2), (4) Date: Sep. 9, 2010

(87) PCT Pub. No.: WO2007/148032
PCT Pub. Date: Dec. 27, 2007

(65) Prior Publication Data
US 2010/0329620 A1 Dec. 30, 2010

(51) Int. Cl.
*G02B 6/00* (2006.01)
(52) U.S. Cl.
USPC .......................................................... 385/135
(58) Field of Classification Search
USPC .................................................. 385/134–137
See application file for complete search history.

(56) References Cited

U.S. PATENT DOCUMENTS

| | | | |
|---|---|---|---|
| 5,278,933 A | 1/1994 | Hunsinger et al. | |
| 5,323,480 A | 6/1994 | Mullaney et al. | |
| 5,548,678 A | 8/1996 | Frost et al. | |
| 6,215,938 B1 * | 4/2001 | Reitmeier et al. | 385/135 |
| 6,282,360 B1 | 8/2001 | Milanowski et al. | |
| 6,418,264 B1 | 7/2002 | Hough et al. | |
| 6,427,045 B1 | 7/2002 | Matthes et al. | |
| 6,480,660 B1 * | 11/2002 | Reitmeier et al. | 385/135 |
| 6,501,898 B1 | 12/2002 | Engberg et al. | |
| 6,539,160 B2 | 3/2003 | Battey et al. | |
| 6,804,447 B2 * | 10/2004 | Smith et al. | 385/134 |
| 6,810,194 B2 | 10/2004 | Griffiths et al. | |
| 6,915,057 B2 | 7/2005 | Vincent et al. | |
| 7,274,852 B1 * | 9/2007 | Smrha et al. | 385/135 |
| 7,751,674 B2 * | 7/2010 | Hill | 385/135 |

FOREIGN PATENT DOCUMENTS

| | | |
|---|---|---|
| EP | 0 531 628 | 9/1996 |
| GB | 2 286 060 | 8/1995 |
| WO | WO 00/17693 | 3/2000 |
| WO | WO 00/28365 | 5/2000 |

* cited by examiner

*Primary Examiner* — Daniel Petkovsek
(74) *Attorney, Agent, or Firm* — Harness, Dickey & Pierce, P.L.C.

(57) ABSTRACT

A cable loop device for use in optical systems may have a front side and a reverse side and may include at least one work area, at least one fiber storage area arranged on the front side, at least one cable storage area disposed on a periphery of the cable loop device, and a guide track configured to route at least one optical fiber between the front side and the reverse side. An optical joint may include one or more base ports disposed through a base of the optical joint and at least one cable loop device mounted within the optical joint. An optical network may include one or more optical cables and at least one optical joint.

39 Claims, 11 Drawing Sheets

CABLE LOOP DEVICE FOR OPTICAL SYSTEMS

CROSS-REFERENCE TO RELATED APPLICATIONS

This application is a national stage entry from International Application No. PCT/GB2006/002303, filed on Jun. 22, 2006, in the Receiving Office of the UK Intellectual Property Office (United Kingdom), the entire contents of which are incorporated herein by reference.

FIELD OF THE INVENTION

The present invention relates to a cable loop device for use in optical systems. In particular, the present invention relates to the storage, management and distribution of optical cables and optical fibres within optical networks, optical hardware or optical joints thereof.

BACKGROUND

Optical communication systems require the laying down of numerous optical cables and fibres. These are connected together using various forms of optical fibre hardware such as optical joints, e.g. optical fibre closures or splicing enclosures. Optical joints are used for storing and managing optical cable and fibre connections and providing work areas in which optical cables and fibres can be worked, for example coupled, split, spliced, terminated or the like. Hereinafter, the operations which are carried out on the optical cables and/or optical fibres—such as coupling, splitting, splicing, terminating—are referred, to as working the cables/fibres. In the optical joint, the cables/fibres can be worked, stored and then sealed from the environment.

Typically, optical joints receive a plurality of optical cables, each in turn having at least one optical fibre. This generally causes congestion of the optical joints due to intertwining of the optical cables and/or of the optical fibres during storage and installation. As more optical cables and fibres are connected to an optical communication system, optical cable and fibre storage, e.g. within the optical joints, becomes evermore difficult.

Traditionally, several optical cables enter an optical joint and are managed in fibre management systems that distribute the fibre throughout the joint. The cables may be secured within the optical joint and later worked, e.g. joined together by butt splicing according to which at least some of the optical fibres are broken out from each cable and spliced together within splicing trays. The remaining unused fibres are simply stored within splicing trays or storage bays of the optical joint until required. However, although this may organise the cable/fibres, it also adds to the total congestion within the optical joint and can be considered as being wasteful of the available optical cable/fibre resources in terms of space and used/unused fibre. As more cables are installed, there is an increased likelihood of optical cable and fibre damage as bending the optical cable and fibres around each other risks bending them beyond their minimum bend radius.

Typically all the optical fibres are broken out of each optical cable upon entering the joint, and the fibre management system deals with all optical fibre by storing or working it. The broken out fibres may be protected with flexible transport tubes, however, the tubes are still required to be stored for excessively lengthy runs of fibre. Alternatively, only those fibres that are required to be worked are broken out of the optical cable, while the remaining optical cable is then stored within the optical joint for future use. However, the remaining optical fibre and cable remain unused and simply take up valuable space within the optical joint.

There are numerous fibre management systems for storing and distributing fibres within a splicing tray. For instance document U.S. Pat. No. 6,427,045 discloses a splice tray for use in splicing fibre optic cables, said splice tray having an outer periphery and a cable splicing area inwardly of the outer periphery. A main cable guideway for receiving a pair of side-by-side cables to be spliced extends along a portion of the outer periphery adjacent thereto. The main cable guideway splits into first and second continuation guideways, the first of which curves inwardly from the outer periphery to intersection with the splicing area from one direction. The second continuation guideway continues along another portion of the outer periphery to intersection with the splicing area from another direction. The two fibre optic cables that extend along the main guideway are separated to extend through the first and second continuation guideways to the splicing area for being joined together in a splice. A cable looping device is provided in the splicing area for receiving cable loops to take up slack, and a splice receiving recess is provided in the splice area for holding a splice. A housing for the splice tray includes a vertical case having a door hinged to the bottom portion thereof for swinging movement about a horizontal hinge axis between a vertical closed position and a horizontal open position. The splice tray is attached to the inside of the door for receiving a pair of cables that extend from the case and across the hinge to the splice tray. An integral inclined guideway extension on the splice tray extends toward the hinge axis along an inclined door bottom wall for receiving the cables.

According to U.S. Pat. No. 6,427,045 the guideways act as channels for routing to the splicing area only two optical cables, with only one optical fibre in each. In fact, since the cables are stored within a central cable looping device, the cables cannot contain more than one optical fibre as any more fibres would not allow the cables to be bent around the central spool. Moreover, since the cables are stored within a cable looping device which is placed centrally with respect to the splice tray, the cable storage is not efficiently performed principally for the reason that a large area of the splice tray is unused. Furthermore, the splice tray according to U.S. Pat. No. 6,427,045 does not provide for a storage area for the optical fibres to be worked, e.g. to be spliced.

Alternative solutions attempt to alleviate optical cable and fibre congestion and damage by storing and guiding optical cables and fibres from separate storage bays to optical fibre trays for use in optical joints. For instance, documents U.S. Pat. No. 6,501,898, U.S. Pat. No. 6,539,160 and U.S. Pat. No. 5,278,933 disclose fibre management systems for guiding and storing optical cables/ribbon cables and optical fibres, respectively.

Document U.S. Pat. No. 6,501,898 relates to an arrangement for handling optical fibres in a confined or limited space, such as connecting, reorganizing and/or cross-coupling optical fibres in a cassette without said fibres intersecting one another. By providing a cassette with looping channels, the optical fibre cables can be organized in a controlled fashion without needing to cross. This arrangement is provided with means for guiding and coiling the optical fibre cables prior to stripping respective cables and mutually separating the enclosed optical fibres in an optical fibre cassette.

According to this document cable coiling and guiding devices are located in the central portion of the bottom part of the connecting box arrangement which comprises a plurality of cassettes (splicing trays) that are stacked for receiving and storing broken-out optical fibres. This results in an inefficient and unsatisfactory use of available space within the optical joint.

Document U.S. Pat. No. 6,539,160 relates to a fibre optic closure, which includes a panel assembly having at least two panels hinged to one another. The panel assembly includes a storage bay sandwiched between a pair of fibre management and connection assemblies. Each fibre management and connection assembly includes a sleeve connector panel that supports at least one sleeve connector array for establishing optical fibre connections. The splice panel having splice tube holders is also provided for establishing splices. The storage bay is disposed between upper and lower splice panels. Moreover, retaining and routing clips are used for keeping in place and guiding the fibres and/or the optical fibre cables in the splice tray.

According to this document the splice panel (tray) does not allow for storing both the optical cable and the optical fibres, the storage thereof being demanded to a storage bay interposed between two splice panels of the fibre optic closure.

Document U.S. Pat. No. 5,278,933 discloses a fibre optic splice organizer for storing optical fibre splices and the slack associated therewith to permit ready separation of the optical fibres. The splice organizer includes a generally rectangular base, splice securing slots on the base, and optical fibre guides for guiding slack portions of first and second optical fibre groups from a first end of the base, along respective portions of the base adjacent the first and second sides thereof, into a plurality of overlying slack loops adjacent the second end of the base, and back to the splice securing means from respective first and second sides of the base. The slack optical fibres, including the overlying respective slack loop, of the first and second optical fibre groups, form a figure-eight pattern on the base and are thus readily separable from each other.

According to this document a storage solution is provided that guides and binds bundles of broken out optical fibres together, stringing them over, around and behind the splicing tray. This solution provides an inefficient use of storage and also hampers access to the splicing bays as bundles of fibres will need to be removed and untangled. This inevitably increases the risk of accidental bending of the fibres beyond their minimum bend radii.

As mentioned above, clamps and ties are used for securing optical cable or fibre within the storage bays of U.S. Pat. No. 6,539,160 or the bundles of fibres in the splicing tray of U.S. Pat. No. 5,278,933. The clamps and ties need to be loosened or cut when optical cables or bundles fibres are re-routed to splicing bays or elsewhere. The use of clamps and cable ties can cause fatigue of the optical cable material at specific points along the cable. Similarly, the fragile optical fibres at these points can be damaged. Further damage can be caused during installation and maintenance as the clamps or ties are tightened/loosened/removed or the hinged covers are removed and replaced when installing/accessing/re-routing the optical cables and bundles of fibres.

In addition, the clamps or ties do not fully support the optical cables or fibres, which are only supported at specific points around the storage bays or splicing trays. This means that spaced lengths of cable and fibre are completely unsupported, said unsupported lengths being possibly bent in towards the centre of the storage bays or splicing tray and stresses being possibly exerted on these unsupported lengths while they are installed, maintained, and held within the storage bay. Therefore, this aspect can further contribute to damage and breakage of the cables/fibres.

The problems of storage and congestion of optical cables within optical joints continue to multiply as the number of splice trays and/or optical cables progressively increases to cope with the demand for high speed communications equipment and capacity.

The Applicant has perceived the need of efficiently organizing the space within a joint closure, and in particular within a splice tray, in order to minimise the size and congestion of the optical joints, meanwhile without causing any damage or breakage to the optical cables and/or fibres when the joint is opened/closed or the trays are moved during installation and maintenance thereof.

SUMMARY OF THE INVENTION

The Applicant has found that efficiently distributing, and possibly saving, the space within a joint closure can be achieved by incorporating in a single unit (i.e. a cable loop device, for instance a splice tray) both a fibre management system (i.e. the splice bays and the fibre storage area) and a loop storage system of the optical cables which are introduced into the joint closure.

In particular, the Applicant has found that, in order to save space within an optical hardware system (e.g. in an optical joint within an optical network), the cable storage area has to be advantageously positioned at the periphery of the single unit mentioned above. Preferably, the cable is stored and kept in place by means of guide tracks which are positioned along substantially the whole periphery of said single unit.

In one aspect, the present invention relates to a cable loop storage device—for use in optical systems—including one or more work areas, one or more fibre storage areas, and at least one cable storage area that is disposed on the periphery of the cable loop storage device.

The present invention avoids, or at least remarkably reduces, the requirements of storage and congestion of separate splice trays and storage bays known in the art. Therefore, according to the present invention, the optical cables are stored and supported by the periphery of the cable loop device, this resulting in the efficient use of space (that is generally wasted in providing separate units) and in the guiding and distribution of optical fibres within the cables directly to within the cable looping device's fibre storage and work areas. An additional advantage of the present invention is that, as opposed to the known prior art, the cable loop device can be manufactured in one piece, i.e. it can be extruded or moulded as a single unit, thus simplifying the manufacture and providing a saving in material and manufacturing costs.

As mentioned above, according to the present invention the reduction in storage and congestion of the optical cable within an optical hardware system, such as an optical joint, is achieved by the unique positioning of the cable storage area in relation to the fibre storage and work areas on the cable loop device. This results in efficient use of available storage space and distribution of optical fibre to the fibre storage and work areas. Namely, the present invention allows that the optical cables can be stored, supported by the cable storage area and secured within the cable storage area, whereby optical fibre within the optical cable can be broken out and directly distributed to the fibre storage and work areas using the above mentioned guide tracks without leaving, or being re-routed or distributed from, the cable loop device. This gives the advantage of protecting the optical fibre from damages due to possible bending beyond its minimum bend radius, when the optical fibres are guided to the fibre storage and work areas.

Preferably, the cable loop storage device further includes a plurality of guide tracks, where a first portion of the guide tracks connects at least one of the fibre storage areas to at least one of the work areas. Preferably, a second portion of the guide tracks connects the cable storage area to at least one of the first portion of the guide tracks. The guide tracks support and protect optical fibre that is guided from the fibre storage areas or cable storage areas to the work areas or elsewhere. The guide tracks are designed to support the optical fibre to prevent the optical fibre from being bent beyond their minimum bend radius.

Instead of being stored at the entrance or stored and routed through an optical hardware system to a storage area separate from the cable loop device, the cable loop device according to an aspect of the present invention is arranged such that the optical cables are distributed and stored in a continuous loop on the cable loop device from their point of entry/exit into/from the optical hardware system.

According to an aspect of the present invention, one or more optical cables are routed through at least one common cable port and looped in the cable storage area that is arranged on the periphery of the cable loop device. This aspect improves the management of the optical cables, e.g. within an optical joint, since, during installation, the optical cables are looped and supported on and by the periphery of the cable loop device, where at least one optical fibre is broken out from the optical cable within the cable storage area and routed (i.e. laid onto/into the guide tracks) onto the fibre storage areas or work areas that are preferably centrally located on the cable loop device.

Preferably, at least one of the cable storage areas is disposed around the periphery of the cable loop device. Preferably, the cable storage area includes an inner periphery that encloses the work and fibre storage areas. This provides for improved storage of optical cable on the cable loop device and allows the optical cable to be looped and supported, by the inner periphery, during installation, storage and maintenance.

Preferably, the cable storage area, in particular the inner periphery thereof, includes arcuately curved inner sections that curve around the periphery of the cable loop device to ensure that optical cables—and thus the fibres contained therein—are not bent beyond their minimum bend radii.

Preferably, the inner periphery of the cable storage area forms a rim or a mandrel around the cable loop device, i.e. around the work and fibre storage areas. This provides continuous support around each loop of an optical cable looped within the cable storage area, thus preventing the optical cable from being damaged, e.g. through localised bending thereof.

Preferably, the optical cables are held and supported within the cable storage areas by an inner peripheral wall, which acts as a mandrel, preventing localised damage to the optical cable (i.e. compared with the known prior art), which in turn protects the optical fibres within from similar localised damage.

The result is the maximisation of the use of the storage area on the cable loop device and a reduction in the number of faults in the optical cables and fibres due to improved support and decreased congestion of the optical cables within the optical hardware system. This results in an improved cable and fibre management system for the routing, distributing and organisation of the optical cable and fibres within, for example, an optical joint.

Preferably, one or more guide rails are arranged around the outer periphery of the cable storage area. Preferably, the one or more guide rails include arcuately curved guide sections that curve towards the inner periphery of the cable storage area. This provides further support for any optical cables looped within the cable storage area. In addition, the curved nature of the guide rails prevents loops of optical cable from springing out of the cable storage area, while at the same time providing support over most of the length of each loop of an optical cable stored within the cable storage area. As already pointed out above, this prevents localised damage to optical cables during installation, maintenance and storage.

Preferably, at least one cable port is disposed through the periphery of the cable storage area. This provides improved installation to the loops of optical cable stored within the cable storage area. Preferably, the at least one cable port is disposed through the outer periphery of the cable storage area. Alternatively, the at least one cable port is disposed between two or more guide rails arranged around the outer periphery of the cable storage area. This provides for easier installation of loops of optical cables within the cable storage area. In addition, only a portion of a continuous optical cable needs to be placed into the cable port, while a portion of the remaining cable is looped onto the cable storage area.

Although the cable ports provide for the entry of an optical cable, they also can provide for the exit of the optical cable after a portion of the cable has been looped onto the cable storage area. This allows the optical cable, as well as the remaining fibres contained therein, to be distributed or routed elsewhere within an optical hardware system, e.g. to another cable loop device positioned elsewhere within the system or optical joint. Thus the cable loop device according to the present invention provides an efficient means for ensuring that resources are reallocated and re-used where necessary.

Preferably, the cable storage area of the cable loop device according to the present invention further comprises a first set of holding portions arranged or spaced around the cable storage area. Preferably, the guide tracks further includes a second set of holding portions arranged or spaced along or on the guide tracks. The holding portions further support and hold the optical cables and fibres within the cable loop device. This prevents, when installed, optical cables and fibres from springing out of their respective storage areas or guide tracks during installation, use, and maintenance.

Preferably, the holding portions further include one or more tabs to hold the optical cables and fibres within their respective areas or guide tracks. This provides the advantage of quick installation of the optical cables and fibres within an optical hardware system as the optical cables and fibres can simply be guided around and under the tabs into their respective storage area or guide tracks, respectively. As the fibre straightens out, the tabs prevent the fibres from springing out of the routing device.

Alternatively, the holding portions may be caps or covers fitted to the cable loop device to cover the cable and fibre storage areas or work areas or cover one or more guide tracks. Alternatively, the cable storage area and/or guide tracks or the first or second sets of holding portions are made up of split tubes or portions thereof, which are secured appropriately on the cable loop device. The split tubes can be made of elastomeric material having a seam, which may be interlocking, that can be split open to allow insertion of optical cables or fibres and when released the seam closes (or locks) thus holding the optical cables or fibres within. Similarly, the holding portion can include a seam, arranged over one or more of the cable storage areas or guide tracks, which can be split open or closed as one or more of the optical cables and fibres are inserted into the cable storage areas and/or guide tracks, respectively.

Preferably, the plurality of guide tracks include arcuately curved track sections that are curved greater than a first predetermined minimum bend radius. This provides protection to optical fibres that are laid into the guide tracks against further damage. Preferably, the inner periphery of the cable storage area also includes arcuately curved inner sections that are curved greater than a second predetermined minimum bend radius. This provides protection to optical cables and the fibres contained therein against further damage from bending over or around corners of the cable storage area.

Preferably, a cover encloses the fibre storage area and the one or more work areas. This provides added protection to optical fibres, by preventing the fibres from springing out of the guide tracks, and to fibre storage and work areas from damage during installation, maintenance and prolonged storage. Preferably, the cover further encloses the cable storage area. This provides further added protection against optical cables looped in the cable storage area from slipping/springing out of the cable storage area.

Preferably, a third portion of the guide tracks connect to the first or second portion of guide tracks and are disposed through to an opposing side of the cable loop device from that of the splicing or fibre storage areas. An advantage that these guide tracks provide is the routing of optical fibre from other devices within the optical hardware system to the fibre storage and work areas of the cable loop device. Preferably the third portion of guide tracks forms a guide ramp extending through to the opposing side of the cable loop device. Preferably, the guide ramp includes arcuately curved track sections or portions that are curved greater then the first predetermined bend radius, providing a smooth transition for the optical fibres entering and/or exiting the cable loop device.

In another aspect, the invention relates to a routing device for use with the cable loop device as described hereinabove. The routing device includes a plurality of input ports, a plurality of fibre guide tracks, where the fibre guide tracks connect to one or more of the input ports. There is at least one output guide track, where at least two of the fibre guide tracks merge into at least one of the output guide tracks, and mounting means for mounting to the cable loop device, where at least one of the output guide tracks mates with at least one end of the third portion of guide tracks and the at least one end is not connected to a first portion of guide tracks.

According to the present invention, one or more optical cables and/or fibres are secured to one or more input ports, where the fibres are routed through the fibre guide tracks to at least one output guide track, from which the optical fibres are distributed onto the cable loop device via the third portion of guide tracks of the cable loop device.

Preferably, the plurality of input ports are spaced apart and a portion of the input ports are arranged in line with at least one of the fibre guide tracks. This provides the advantage that optical fibres are kept substantially straight while being routed along the fibre guide tracks, preventing any damage through bending beyond their predetermined radii.

Preferably, the fibre guide tracks further include holding portions or tabs spaced apart on at least one top edge of the fibre guide tracks. These elements contribute in providing an efficient system and method for securing optical fibre to within the fibre guide tracks. The modifications and further aspects of the first and second set of holding portions, as described previously in relation to the cable loop device's guide tracks and cable storage area's inner periphery, can also apply to the holding portions or tabs of the routing device.

In another aspect, the invention relates to an optical joint for use in optical systems, the optical joint including one or more base ports—that are disposed through the base of the optical joint—and at least one cable loop device, as described herein above, within the optical joint.

Preferably, at least one cable loop device according to the present invention is arranged within the optical joint such that the one or more optical cables are looped, secured and stored within at least one cable storage area. This provides an efficient use of space, which reduces the wear and tear on the optical cables and optical fibres contained therein.

Preferably, the optical joint includes at least one routing device as hereinbefore described. This provides a means for routing further (additional) optical fibres from elsewhere within the optical hardware system onto the cable loop device. Preferably, at least one of the routing devices is arranged and/or mounted to at least one of the cable loop devices. The input ports of the routing device are oriented for receiving one or more further optical cables or fibres within/ or into the optical joint. Preferably, the further optical cables or fibres are directly routed to the routing device, thus minimising the congestion of the optical cable or fibres within the optical joint. These further cables or fibres can be output cables or fibres, an end of which is to be spliced to the optical fibres from the cables looped within the cable loop device. The output cables and fibres exit the optical joint through the one or more base ports.

According to the present invention, improved optical cable and fibre management in terms of efficient use of available storage space and improved support of the optical cables within the optical joint can be achieved thanks to the cable storage area on the periphery of the cable loop device. In fact, smaller optical joints can be designed due to this unique space saving arrangement. This further protects the optical cables and fibres from damage caused by intertwining cables or fibres or by bending the cables or fibres beyond their minimum bend radius as they are installed within the optical joint.

Preferably, the optical joint is weatherproofed by providing an optical joint cap or cover, which may be domed, or shaped to accommodate the cable loop devices and routing devices, a portion of optical cables and fibres and the further components of the optical joint. Such a cover can be used to seal the cable loop devices, routing devices, optical cables and optical fibres from the environment, particularly from water. The optical joint cover can be secured to the optical joint by a securing mechanism, e.g. a screw thread, latches or clips, where the optical joint and/or cover are sealed with a waterproof sealant such as a silicon based sealant.

In another aspect, the present invention relates to an optical network that includes one or more optical cables and at least one optical joint as described hereinabove, where at least one of the optical cables enters at least one of the base ports of the optical joint and enters at least one of the cable storage areas of at least one of the cable loop devices as described hereinabove.

Preferably, a remaining length of the optical cable that has entered at least one of the cable storage areas exits the cable storage area. Preferably, the remaining length of the optical cable exits through at least one of the base ports of the optical joint.

Preferably, a section of the optical cable within at least one of the cable storage areas is removed and a portion of optical fibres is removed and guided through the second portion of guide tracks of the at least one cable looping device according to the present invention. The removed section of optical cable (also known as a window) allows a selection of fibres to be broken out of the optical cable and routed to the fibre storage areas or work areas of the cable loop device. These fibres can then be worked, i.e. spliced together or to other fibres entering the cable loop device such as output fibres entering the cable loop device from the routing device and the third portion of guide tracks. Preferably, the removed section of optical cable can be a portion of the sheath of the optical cable. Preferably, the removed section of optical cable is located adjacent to at least one of the second portion of guide tracks of the cable loop device in order to minimise the length of optical fibre that is not protected by a guide track. Alternatively, tube elements can be installed over the broken out optical fibre to further protect the optical fibre within the cable storage area from may possible damage.

Preferably, the remaining portion of optical fibres are left within the remaining length of optical cable. This allows the optical cable and the remaining portion of optical fibres to exit the cable loop device for routing or distribution elsewhere within the optical network, in fact which positively results in an efficient allocation of network resources.

In a further aspect, the present invention relates to a method of using a cable loop device as described hereinabove with at least one optical cable, where the at least one optical cable includes one or more optical fibres. The method includes the steps of looping a first optical cable around the at least one cable storage area, selecting at least one section of the first optical cable for removal, removing said at least one section of the first optical cable to expose a first portion of optical fibres, removing the first portion of optical fibres from the first optical cable and guiding the first portion of optical fibres through at least one of the second portion of guide tracks to within one or more of the splice areas or within one or more of the fibre storage areas.

Preferably, the method includes the steps of securing a second optical cable to a routing device as hereinbefore described. Preferably, at least one optical fibre is removed from the second optical cable and at least one of the optical fibres of the second optical cable is guided through at least one of the fibre guiding tracks to the output port of the routing device for further distribution. This provides added protection for any optical fibres that are needed to be routed within the optical joint.

Preferably, further steps are provided for mounting the routing device, as described herein, to the cable loop device as described herein. Preferably, at least one of the optical fibres of the second optical cable is guided from an output port of the routing device to the third portion of guide tracks in line with the output port. Preferably, the at least one of the optical fibres of the second optical cable is routed to the work area for working (e.g. for splicing or coupling) with at least one of the first portion of optical fibres from the first optical cable. Alternatively, the optical fibres of the second optical cable can be stored within one or more of the fibre storage areas.

Preferably, the step of looping includes the first optical cable being looped around the inner periphery of the cable storage area. According to the present invention, the inner periphery of the cable storage area acts as a mandrel that further supports the loops of the first optical cable without the need of supporting means, such as brackets, clamps or cable ties, which are locally distributed at predetermined intervals in the cable storage area. Thus the present invention advantageously avoids that localised damages to the optical cable or fibres can occur, said damages being caused by the presence, of said supporting means. Preferably, the step of looping further comprises guiding a remaining length of the first optical cable off the cable looping device for storage or splicing elsewhere. This allows reallocation of the optical cable and fibre resources that have not been used.

Preferably, the step of selecting further includes selecting the position of at least one of the sections in proximity to at least one of the second guide tracks. This ensures that the optical fibres that are broken out of the first optical cable are directly guided and stored within the cable loop device. Further tube elements may be used to protect the fibres between exiting the optical cable and entering the second portion of guide tracks of the cable loop device.

The cable loop devices and routing devices as hereinbefore described can be mounted to each other or to an optical joint using, for example, snap-fit joints, slide-fitting joints, latches, a combination of these or any other securing means that are advantageous to allow additional cable loop devices or routing devices to be quickly or easily installed to each other or to the optical joint when needed. Alternatively, a more secure mounting mechanism may be required, for example screws or bolts, which can prevent accidental removal of the cable loop devices or routing devices due to possible strains on the optical cables and fibres thereof.

Preferably, the present invention is suitable for small fibre counts. More preferably, the present invention is suitable for fibre counts up to 24 fibres.

BRIEF DESCRIPTION OF THE DRAWINGS

Preferred features of the invention will now be described, purely by way of example, with reference to the accompanying drawings, in which:

FIG. 1b illustrates a reverse perspective view of the embodiment of the invention as illustrated in FIG. 1a.

FIG. 1c illustrates a plan elevation of the embodiment of the invention illustrated in FIG. 1a.

FIG. 2b illustrates a zoomed in section of the invention as illustrated in FIG. 2a.

FIG. 4b illustrates a reverse perspective view of an embodiment of the optical joint of FIG. 4a.

DETAILED DESCRIPTION OF THE PREFERRED EMBODIMENTS

Figure 1A:
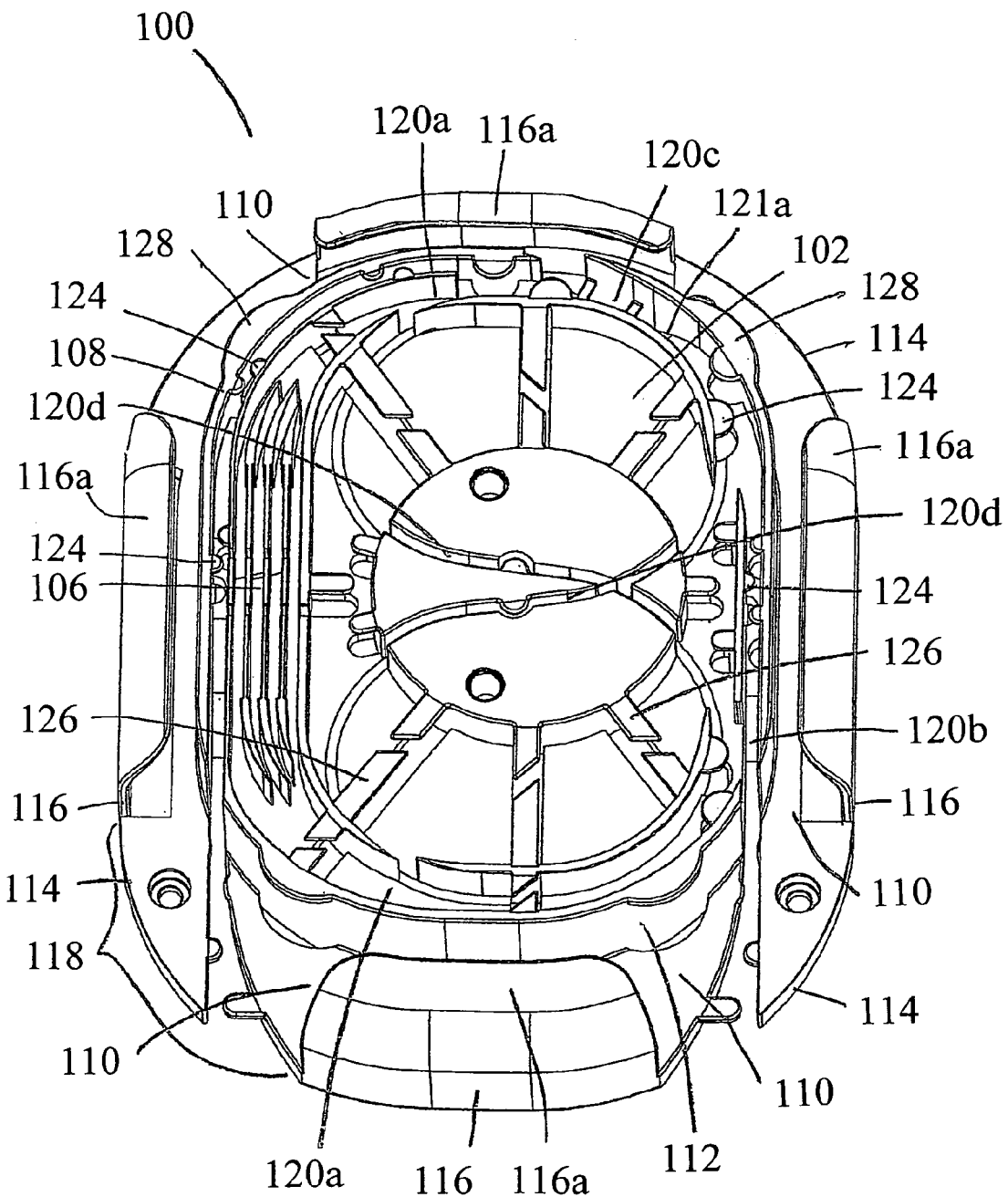
FIG. 1a illustrates a perspective view of an embodiment of the invention for use in optical systems.
Figure 1B:
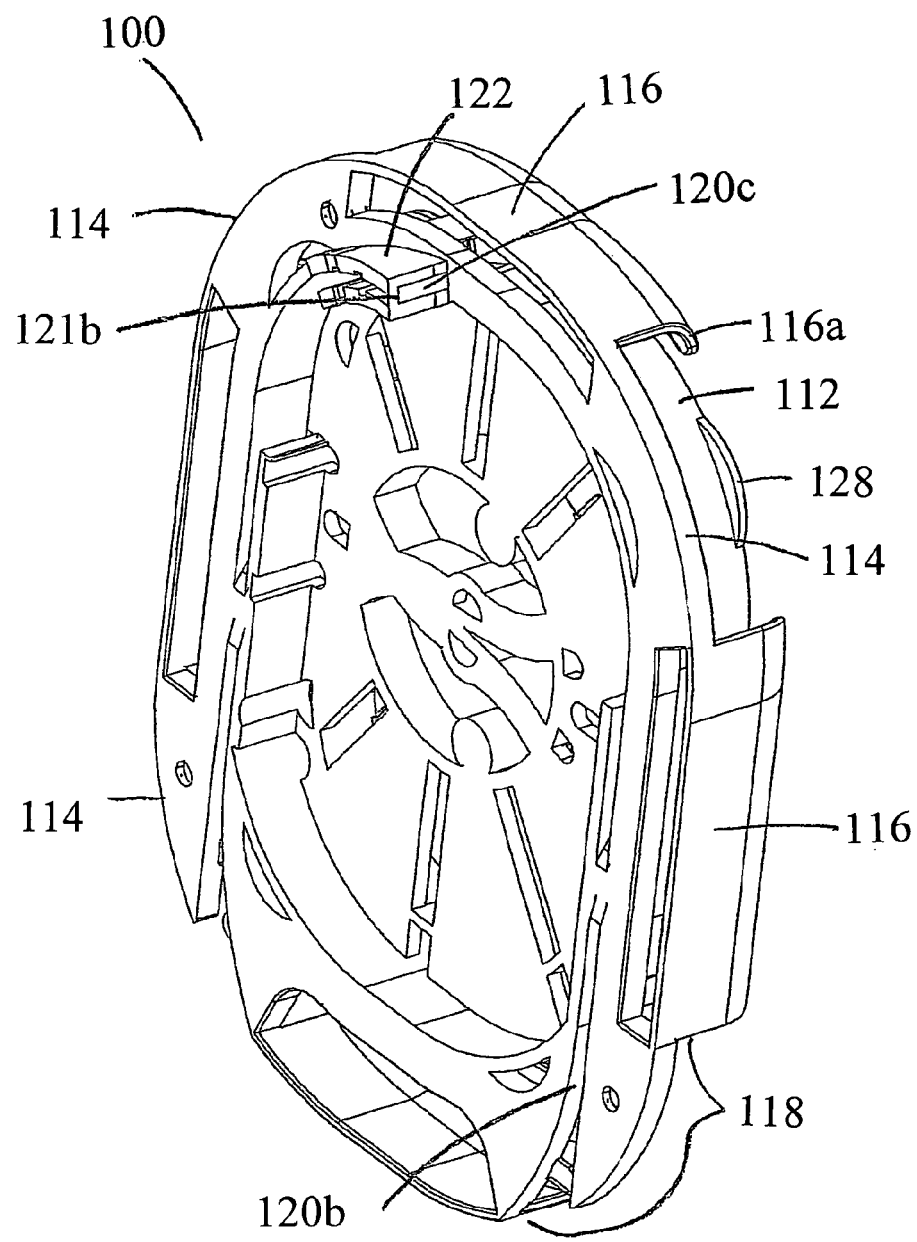
Figure 1C:
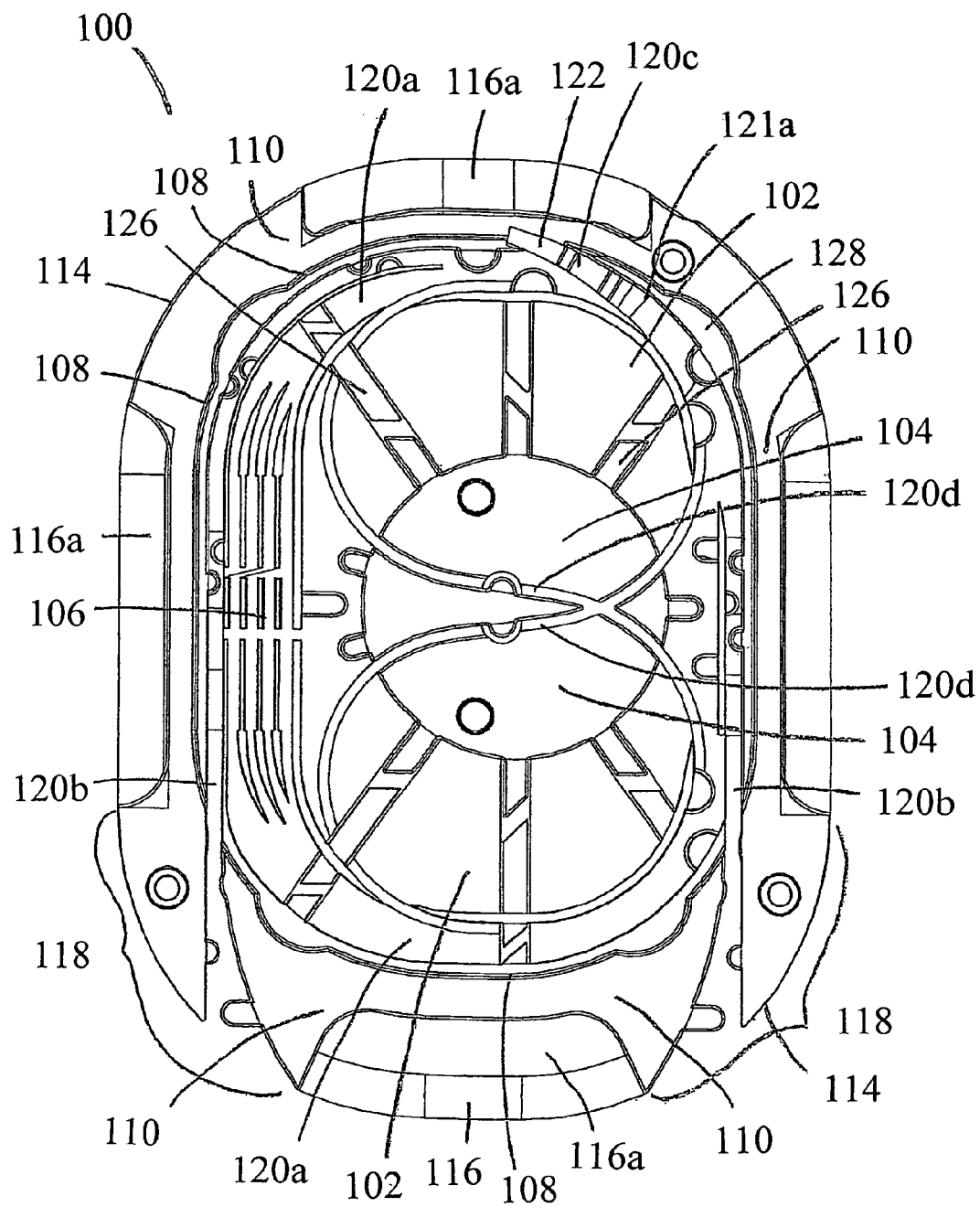
Figure 1D:
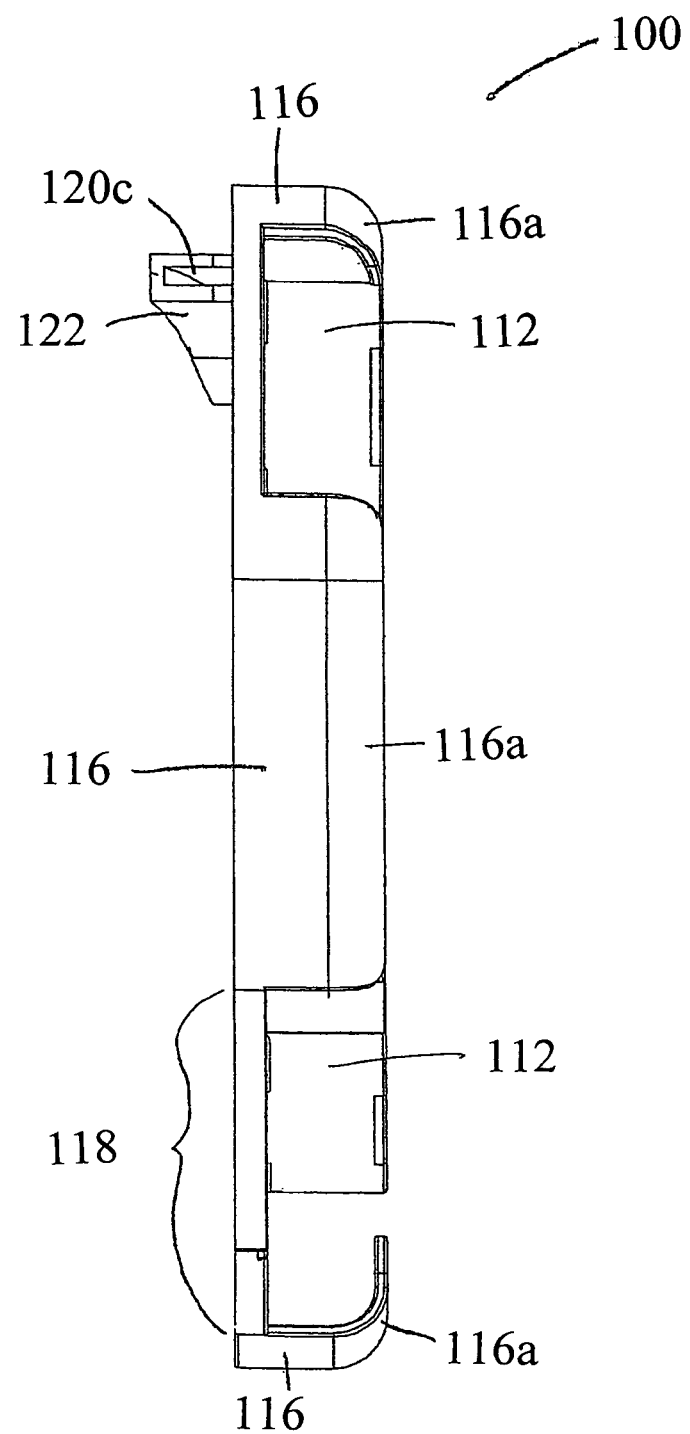
FIG. 1d illustrates a left side elevation of the embodiment of the invention as illustrated in FIG. 1b.

Two perspective views of a cable loop device 100 for storing, routing and distributing optical cable and optical fibres in an optical system is shown in FIGS. 1a and 1b. Plan and left side elevations of the cable loop device 100 are shown in FIGS. 1c and 1d.

Referring to FIGS. 1a to 1d, a brief overview of the cable loop device 100 is now given followed by a detailed description of its components and use. The cable loop device 100 includes a fibre storage area 102, a mandrel 104 centrally located within the fibre storage area 102 and a work area 106.

According to the embodiment shown in the figures, the work area 106 includes four splicing bays. However, the work areas 106 could include other types of bays for working an optical fibre such as by coupling, splitting, terminating or the like. The fibre storage area 102 and work area 106 are enclosed by the periphery 108 of the cable loop device 100.

The cable storage areas 110 are disposed on the periphery 108 of the cable loop device 100. The periphery 108 of the cable loop device 100 forms inner guide rails 112 of the cable storage area 110. According to the present invention, the cable storage area 110 is disposed around the periphery 108 of the cable loop device 100. This enables the periphery 108 of the cable loop device 100 to provide support for loops of optical cable(s) stored in the cable storage area 110.

The outer periphery 108 of the cable loop device 100 forms the inner periphery 112 of the cable storage area 110. The inner periphery 112 of the cable storage area 110 will now be referred to herein as the inner guide rails 112. Located and spaced around the outer periphery 114 of the cable storage area 110 are one or more outer guide rails 116 through which one or more cable ports 118 are positioned. In the embodiment shown in the figures four cable ports 118 are illustrated (only one is referenced) which are arranged around the cable loop device 100.

The cable loop device 100 of the present invention comprises a plurality of guide tracks 120a to 120d, in which a first portion of guide tracks 120a connects the fibre storage area 102 with the work area 106. A second portion of guide tracks 120b connects the cable storage area 110 with the fibre storage area 102 and/or the work area 106. As is clearly shown in FIGS. 1a, 1b and 1c, a length of the second portion of guide tracks 120b is disposed through the cable loop device 100 to the back of the cable loop device 100. This enables fibres to be routed from the back of the cable loop device 100 to the front of the cable loop device 100.

A third portion of guide tracks 120c is disposed through the cable loop device 100 via a guide ramp 122 (more clearly seen in FIGS. 1b to 1d) which connects the third portion of guide tracks 120c from first portion of guide tracks 120a at one end of the third portion of guide tracks 120c and exits at the back of the cable loop device 100 (as shown in FIG. 1d) at the opposing end of the third portion of guide tracks 120c. A fourth portion of guide tracks 120d crosses through the mandrel 104 of the fibre storage area 102. The fourth portion of guide tracks 120d enables changes of direction of fibre stored within the fibre storage area 102 or routed from the fibre storage area 102 to the work area 106.

A plurality of holding portions 124 and 126 is located on the guide tracks and within the fibre storage area 102, respectively. Located on and spaced around the inner guide rail 112 are further holding portions 124. The outer guide rails 116 also comprise arcuately curved guide sections or portions 116a that curve in towards the inner guide rails 112 and/or the centre of the cable loop device 100.

Figure 2A:
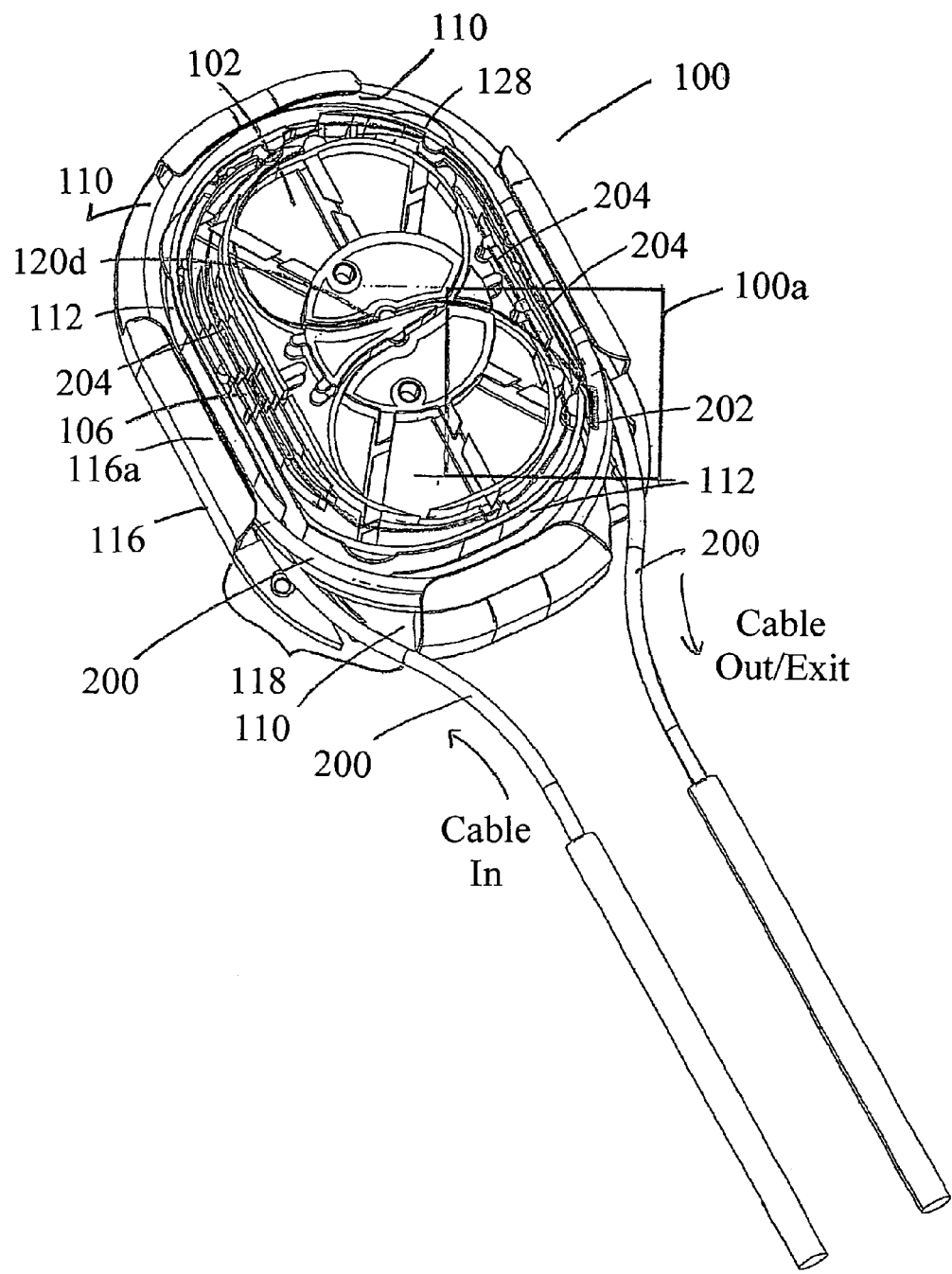
FIG. 2a illustrates a perspective view of an embodiment of the invention as illustrated in FIGS. 1a to 1d with an optical cable installed.
Figure 2B:
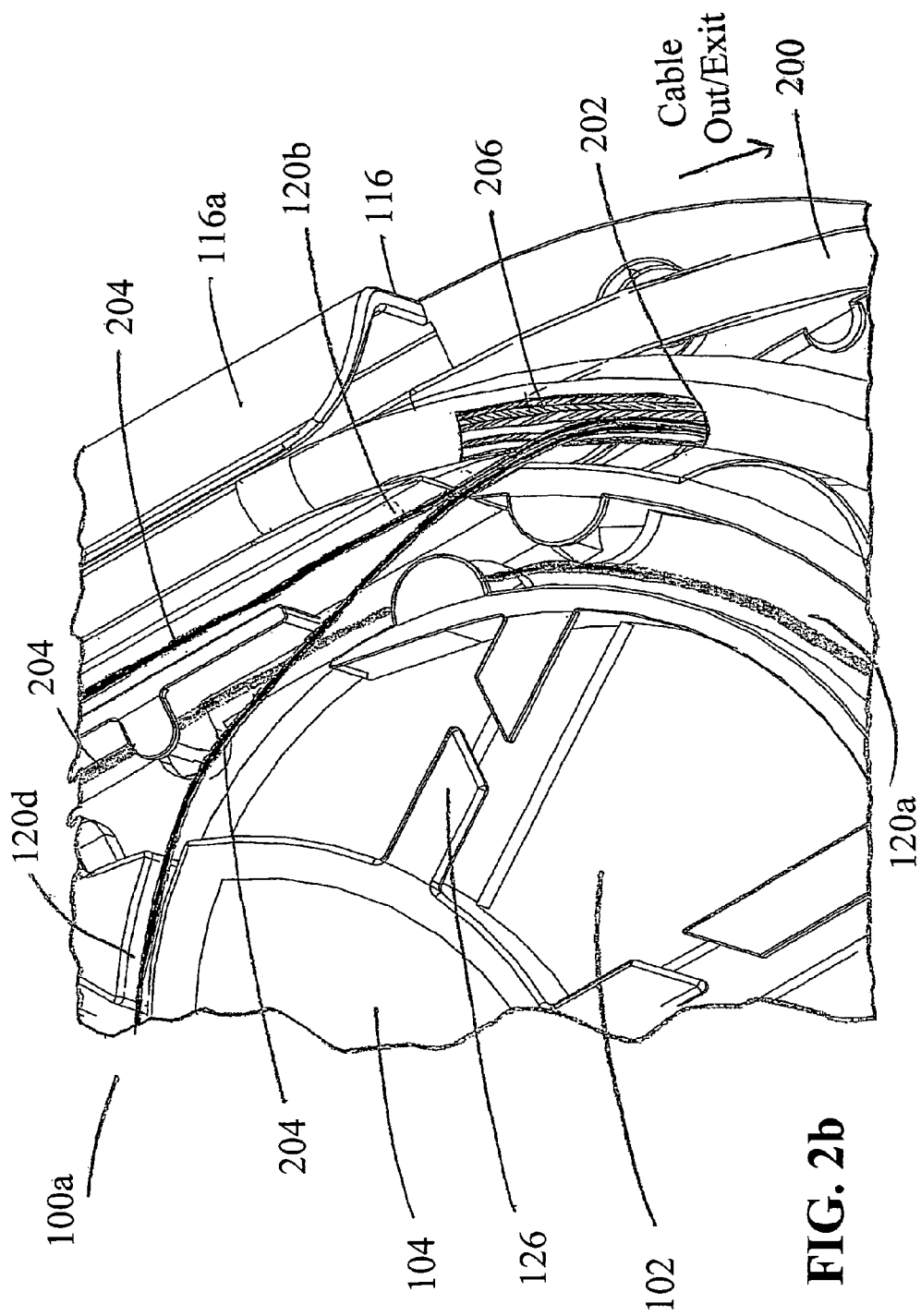

Referring now to FIGS. 2a and 2b, an optical cable 200 entering the cable loop device 100 through a cable port 118 into the cable storage area 110. FIG. 2b provides a more detailed illustration of view 100a when optical fibres 204 are broken out of the optical cable 200. The optical cable 100 is looped onto the cable loop device 100 for storage, breaking out, routing and distribution of one or more optical fibres 204 within the optical cable 200 to within the fibre storage areas 102 and/or work areas 106.

The optical cable 200 is placed through cable port 118 and looped around the inner guide rails 112 of the cable storage area 110. The inner guide rails 112 of the cable storage area 110 act like a mandrel for looping/coiling and storing the optical cable. In FIGS. 2a and 2b the looped optical cable 200a is shown looping several times within the cable storage area 110. The inner guide rails 112 include curved inner sections that are curved to ensure the optical cable 200 is not bent beyond a predetermined minimum bend radius. Said radius can differ for various optical cables and there will be numerous possible embodiments of the cable loop device 100 to cater for the wide range of optical cables and fibres available and their wide range of minimum bend radii.

The inner guide rails 112 comprise holding portions 128 which provide support to the optical cable 200 by holding it within the cable storage area 110. Similarly, the outer guide rails 116 also provide support to hold the looped optical cable 200a within the cable storage area 110. This prevents the optical cable 200 from uncoiling from or springing out of the cable storage area 110 of the cable loop device 100.

Once the optical cable 200 has been looped around the periphery 108 of the cable loop device 100, i.e. around the inner guide rail 112 of the cable storage area 110, one or more optical fibres 204 (two optical fibres 204 in FIG. 2b) of the optical cable 200 are broken out. The remaining optical fibres 206 remain protected within the optical cable 200 until required. The broken out optical fibres 204 are guided from the cable storage area 110 through the second portion of guide tracks 120b and routed to the fibre storage area 102 for storage or the work area 106 (not shown in FIG. 2).

As shown in FIG. 213, a section of the outer sheath 202 of the optical cable 200 is removed to expose a portion of the optical fibres within—this portion may be referred to as a window. The removed section of the outer sheath 202 of optical cable 200 is preferably located adjacent, i.e. proximate, to the second portion of guide tracks 120b of the cable loop device 100 to ensure the broken out optical fibres are routed to within the cable loop device 100 as directly as possible.

If the fibres 204 are routed to the fibre storage area 102, then they are typically looped under the holding portions 126 and around the mandrel 104 until needed. When the fibres 204 are required to be worked, for example to be spliced, they are guided from the fibre storage area 102 to the work area 106 via the first portion of guide tracks 120a. If two fibres that are to be worked are looped in the same direction within the fibre storage area 102, i.e. around the mandrel 104 in the same direction, then the fourth portion of guide tracks 120d (seen more clearly in FIGS. 1a and 1c) within the mandrel 104 (and the first portion of guide tracks 120a) can be used to reverse the direction of one of the optical fibres 204 such that they are routed through the first portion of guide tracks 120a and enter the work area 106 from opposite ends of the work area 106 so they can be worked.

Referring back to FIGS. 1a to 1d, the third portion of guide tracks 120c is used to route optical fibre from the opposite side of the cable loop device 100 through a guide ramp 122 into the fibre storage area 102 and/or the work area 106. Taking a point of reference as FIG. 1c, optical fibre can be routed up guide ramp 122 onto the first and/or second portion of guide tracks 120a and 120b, respectively.

The guide tracks 120a to 120d and the guide ramp 122 include arcuately curved track sections that are curved where necessary to ensure that the fibres 204 are not bent beyond their minimum bend radii. In detail, the guide ramp 122 has a base that includes an arcuately curved track section that curves from the back of the cable loop device 100 (as shown in FIG. 1b) up to the front of the cable loop device 100. This prevents optical fibre that is guided on the guide ramp 122 and then onto other guide tracks 120a to 120d from being bent beyond a predetermined minimum bend radius.

Referring to FIG. 2a, the optical cable 200 can be a continuous length of optical cable 200, which is allowed to exit the cable loop device 100 through a different cable port 118. This allows further routing and/or distribution of the optical cable 200 to other cable loop devices 100, optical joints, or optical hardware within an optical network. Moreover, this ensures that the remaining optical fibres 206 within the continuous length of optical cable 200 are efficiently reallocated.

Referring to FIGS. 1a to 1d and 2a and 2b, a plurality of guide tracks 120a to 120d is shown in which a first portion of guide tracks 120a guides, supports and holds optical fibre 204 for routing to and from the fibre storage area 102 and work area 106. These guide tracks 120a to 120d allow the fibre storage area 102, work area 106 and cable storage area 110 to be connected together. A second portion of guide tracks 120b guides, supports and holds the optical fibre 204 for routing to and from the cable storage area 110, the fibre storage area 102 and/or the work area 106.

The second portion of guide tracks 120b can also guide optical fibre 204 from the reverse side of the cable loop device 100 as shown in FIG. 1b into the fibre storage area 102 and/or work area 106 on the front side of the cable loop device 100 as shown in FIGS. 1a and 1c. This is achieved by having a portion of the second portion of guide tracks 120b disposed through the base of the cable loop device 100 to the reverse side of the cable loop device 100, as shown in FIGS. 1a and 1c and FIG. 1b, respectively.

Figure 3A:
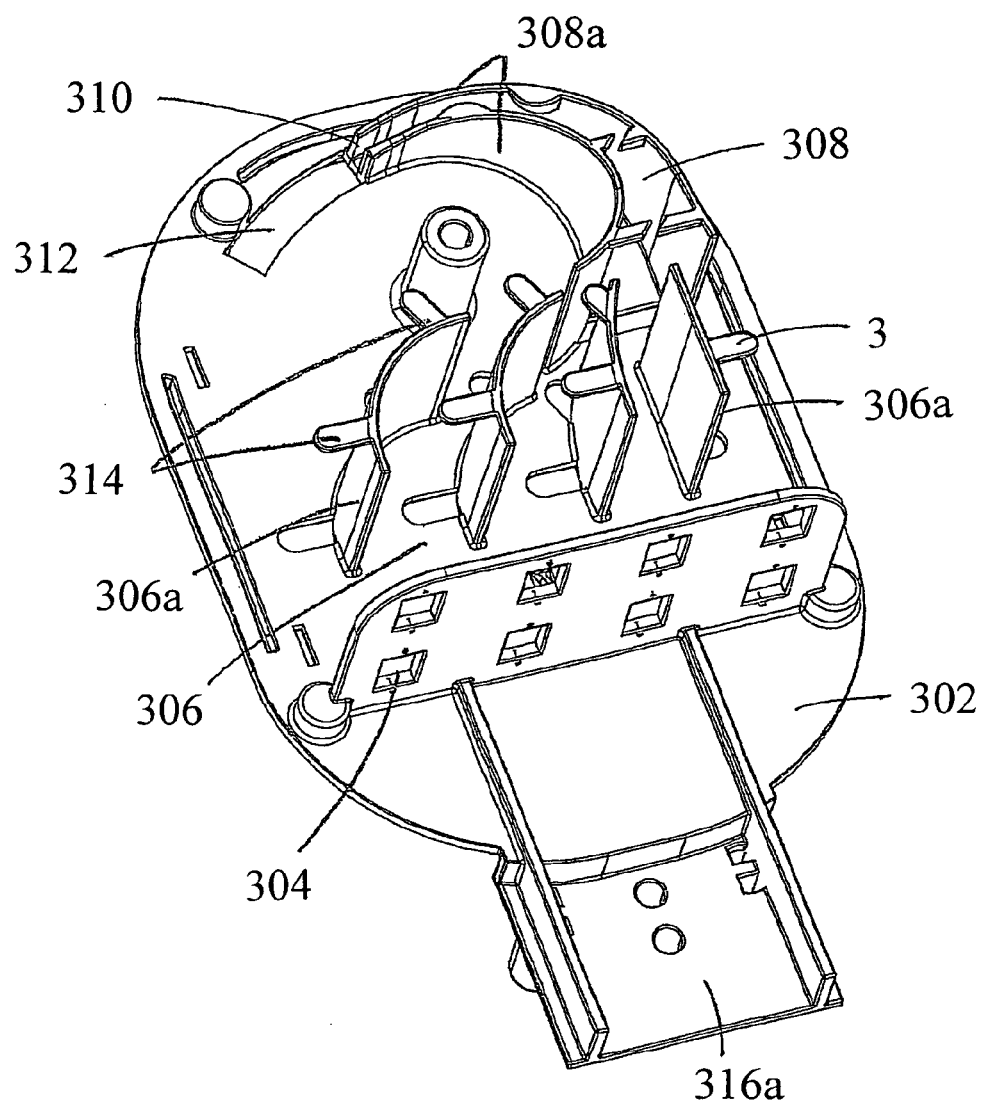
FIG. 3a illustrates a perspective view of an embodiment of a routing device for use in conjunction with the embodiments of the invention illustrated in FIGS. 1a to 1d and 2.
Figure 3B:
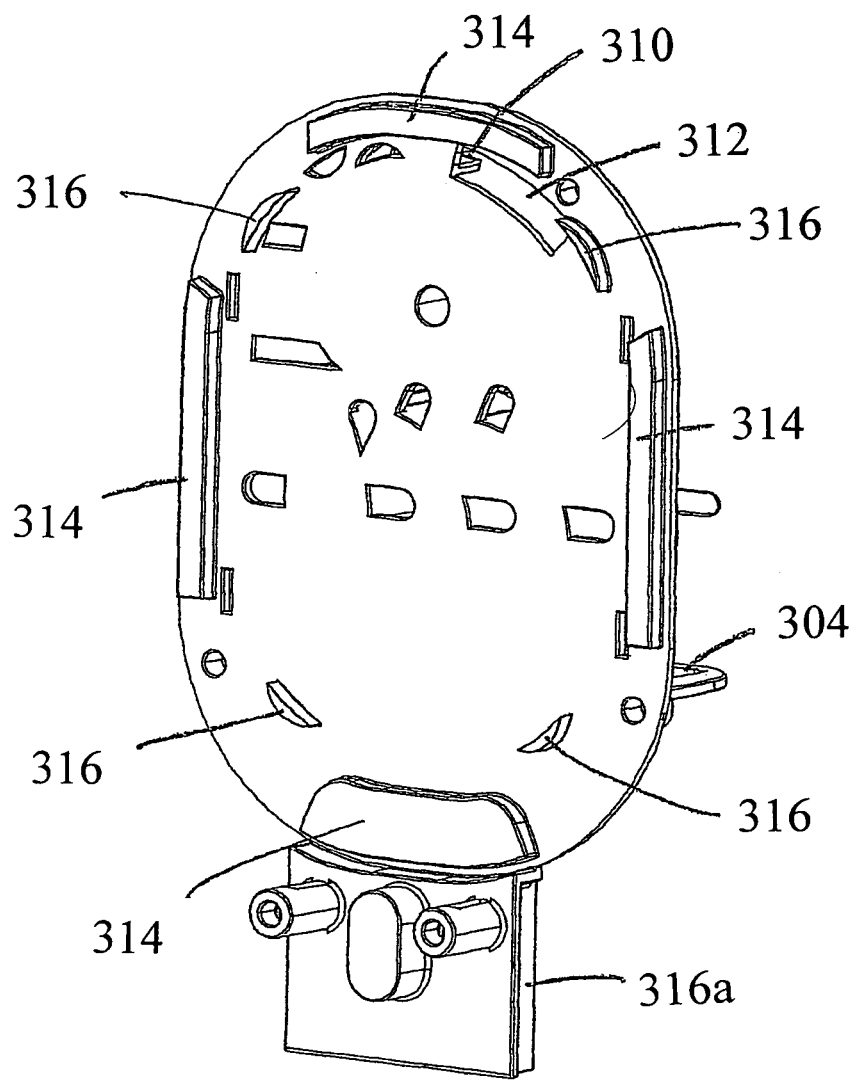
FIG. 3b illustrates a reverse perspective view of the embodiment of the routing device for use in conjunction with the embodiments of the invention illustrated in FIGS. 1a to 1d and 2.

Referring now to FIGS. 3a and 3b, forward and reverse perspective views of a routing device 300 are shown. The routing device provides a means for routing and distributing optical cables and fibres in an optical system, such as an optical joint. In the present case, the routing device 300 is used to route and distribute optical fibres onto the cable loop device 100.

A brief overview of the routing device is now given. The routing device 300 provides a means for effectively controlling the routing, distribution and protection of the optical fibres within, for example, an optical joint 400. The routing device 300 includes a router base 302 onto which is mounted one or more input ports 304 (only one is labelled) which are arranged in line with one or more fibre guide tracks 306. According to the embodiment shown in FIG. 3; five fibre guide tracks 306 are shown. The fibre guide tracks 306 include fibre guide rails 306; four of which can be seen in FIG. 3; for guiding the optical fibre through, and holding the optical fibre within, the fibre guide tracks 306. The fibre guide tracks 306 merge to form an output guide track 308 with one or more output ports 310. The output guide track 308 includes output guide rails 308a for guiding optical fibre through, and holding the optical fibre within, the output guide track 308. The fibre and output guiding tracks 306 and 308 include arcuate (curved) sections that route the optical fibres towards the output port 310.

Adjacent to the output ports 310 is a mating recess 312 to receive a portion of the third portion of guide tracks 120c (not shown) and ramp 122 (not shown) of the cable loop device 100. Mounted on the reverse side of the router base 302 are one or more mounting points 314, 316, 316a, which are arranged to be used to mount the routing device 300 onto the cable loop device 100. The mounting points 314 and 316 mate with the corresponding mounting points (not shown) of the cable loop device 100. As will be seen in FIGS. 4a to 4c, mounting point 316a can be used to mount the muting device 300 onto the base 404 of the optical joint 400.

As will be described in detail later, optical cables and/or optical fibres are received and secured within the input ports 304. If optical cables are secured within the input ports 304, then the optical fibres within the optical cables are broken out of the optical cable. On the other hand, if optical fibres are secured within the input ports 304, these can simply be sent through the input ports 304 and laid in the fibre guide tracks 306. The optical fibre is routed from an input port 304 that is in line with a fibre guide track 306, this ensures that the optical fibres are kept substantially straight between the input port and the beginning of the fibre guide track 306, thus avoiding unnecessary bending of the optical fibre beyond its minimum bend radius.

The optical fibre is muted—through the fibre guide tracks 306—to the output guide track 308, which guides the optical fibre out through the output port 310. The fibre and output guide tracks 306 and 308 include arcuate (curved) sections that are designed such that the optical fibres are not bent beyond their minimum bend radius. For example, in current industry practice it is preferred that optical fibres have a minimum bend radius of approximately 30 mm.

In routing an optical fibre through the fibre guide tracks 306, each optical fibre is laid onto the corresponding guide tracks 306 and through to the output port 310. In laying down the optical fibres, the fibres are moved around and under the corresponding mounting points 314 on the fibre guide tracks 306 and output guide tracks 308. According to the embodiment shown in the figures, the mounting points 314 are located on the fibre guide rails 306a of each fibre guide track 306 and on the output guide rails 308a of the output guide track 308. The mounting points 314 hold the optical fibres within the fibre and output guide tracks 306 and 308, respectively, and—once installation is complete—they ensure that the optical fibres do not spill out of the guide tracks.

If the routing device 300 is mounted onto the cable loop device 100, then the guide ramp 122 of the cable loop device 100 (as seen in FIGS. 1b to 1d) mates with the mating recess 312 to receive the optical fibres for further routing (through the third portion of guide tracks 120c and first, second and fourth portion of guide tracks 120a, 120b, and 120d, respectively) and distribution into the fibre storage area 102 or work area 106 output.

Figure 4A:
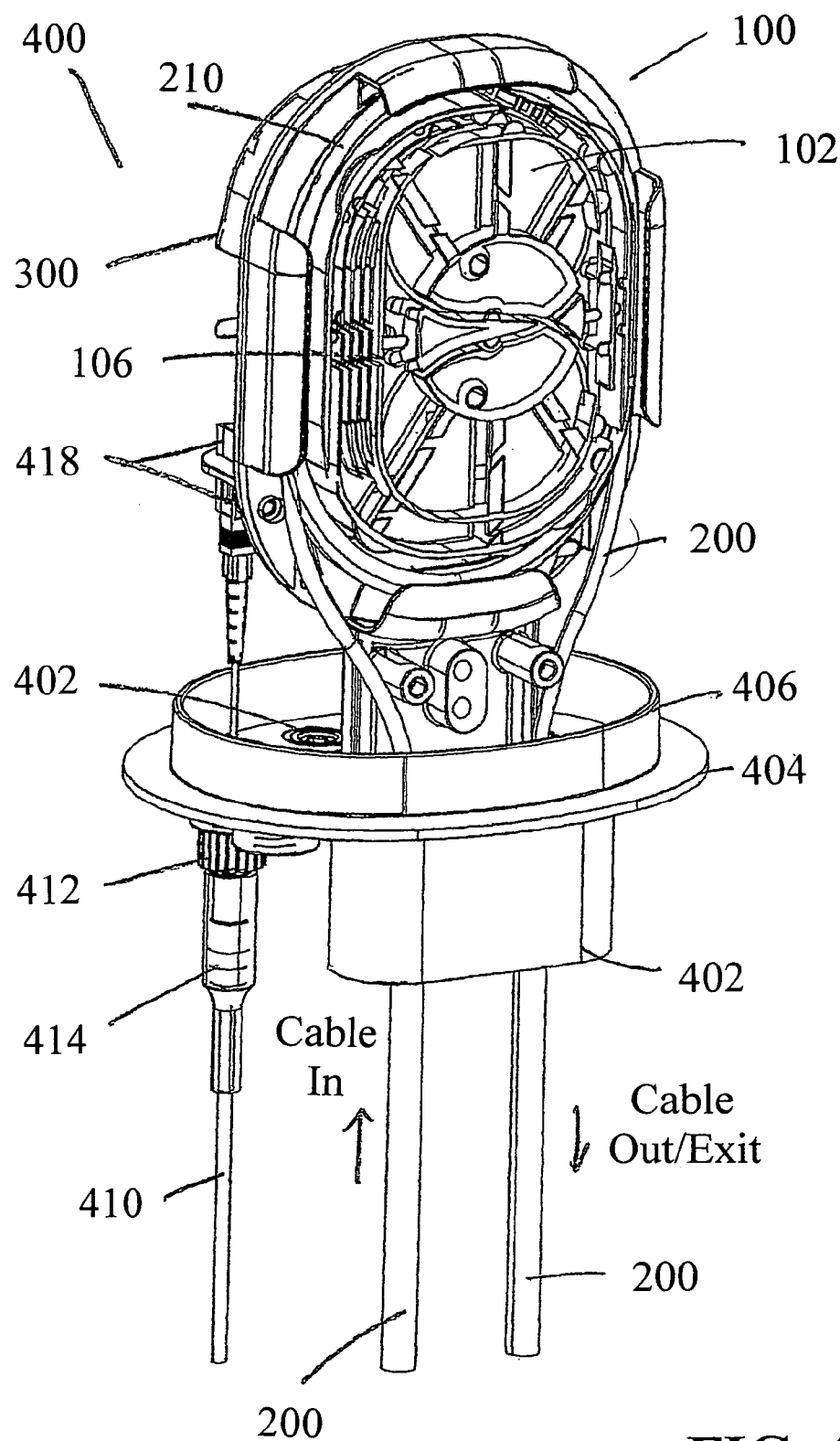
FIG. 4a illustrates a facing perspective view of an embodiment of an optical joint that uses the embodiment of the invention as illustrated in FIGS. 1a to 1d and 2 in conjunction with the embodiment of the routing device as illustrated in FIGS. 3a and 3b.
Figure 4B:
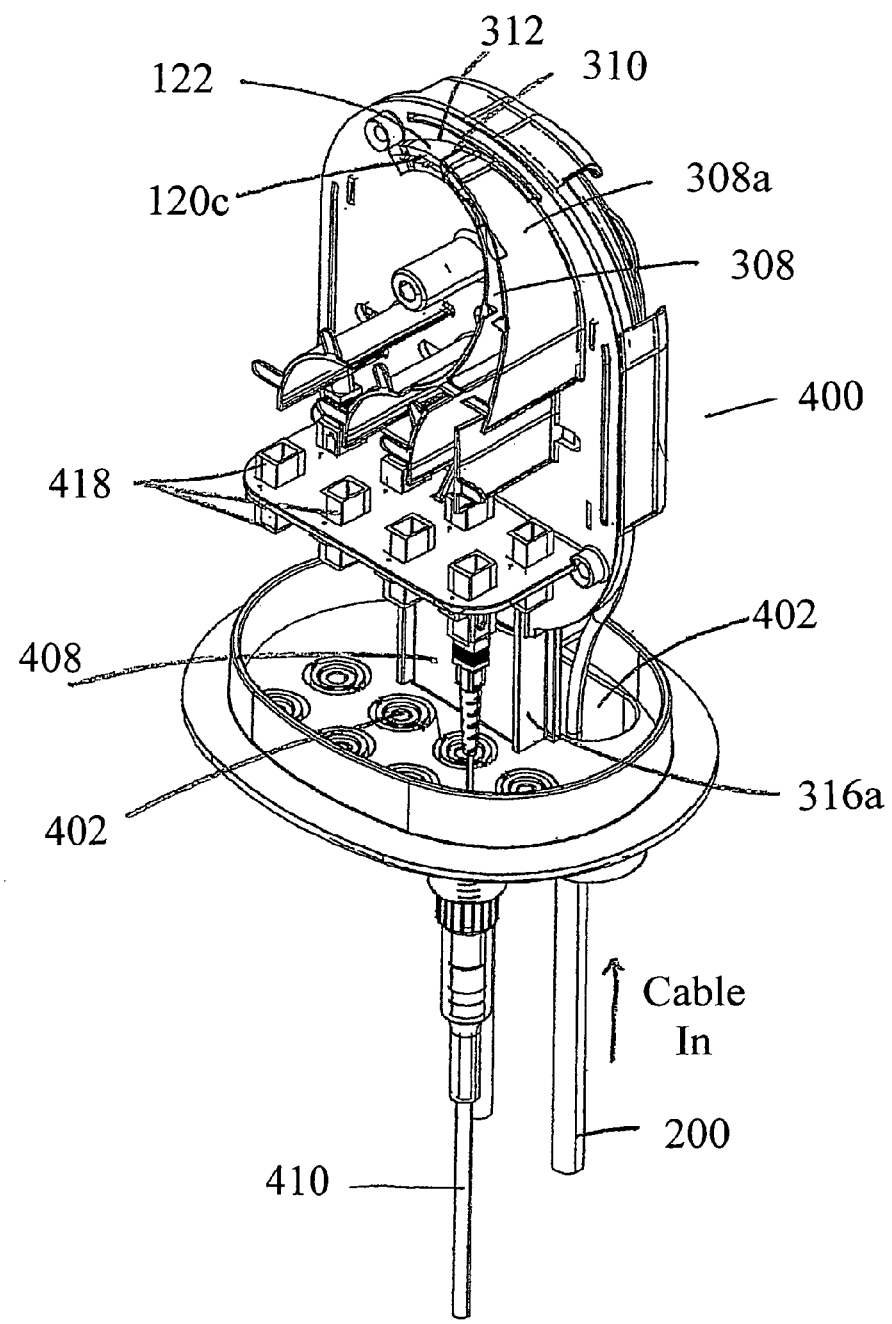
Figure 4C:
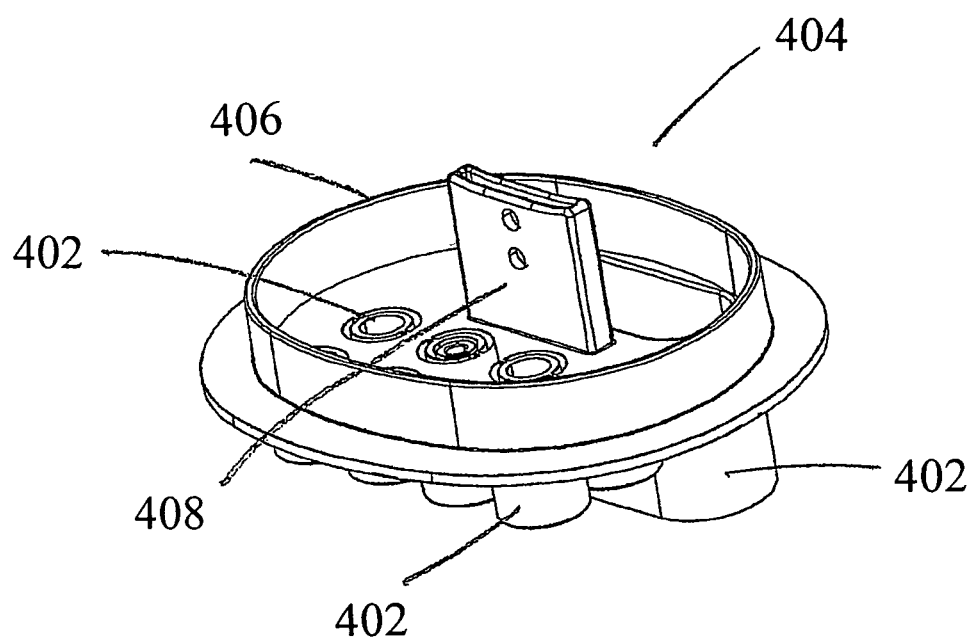
FIG. 4c illustrates a perspective view of an embodiment of the base of the optical joint of FIGS. 4a and 4b.

Referring to FIGS. 4a, 4b and 4c, an optical joint 400 without its cap (or cover) is shown with a cable loop device 100 and a routing device 300 mounted together. The optical joint 400 includes one or more entrances 402—which are hereinafter called base ports 402—that connect through a base 404. The base 404 includes a base rim 406 onto which a cap or cover fits and connects to a device mount 408 (seen more clearly in FIG. 4c) for mounting various devices such as one or more cable loop devices 100 and/or one or more routing devices 300. As can be seen, the mounting point 316a of the routing device 300 is used for mounting the routing device 300 onto the device mount 408.

An example of the use of mounting the cable loop device 100 to the routing device 300 is that the cable loop device 100 can receive an optical cable 200 in which a portion of the optical fibres contained therein are required to be spliced and connected to output fibres that are connected to other locations in an optical network, e.g. distributing each optical fibre from a bulk optical cable down the final mile to individual homes. The routing device 300 receives the output optical cables 410, the fibres of which are spliced to those broken out of the optical cable 200 within the cable storage area 110 of the cable loop device 100.

According to the embodiment shown in the figures, an optical cable 200 is shown entering and exiting (as shown by the direction arrows) the optical joint 400 through one or more base ports 402. The cable loop device 100 stores the optical cable 200 within cable storage area 110 on the periphery of the cable loop device 100 and routes optical fibres within the loops of optical cable 200 to fibre storage or work areas 102 and 106 for storage and/or working, respectively.

Additional optical cables 410—also known as output optical cables 410—are secured to one or more of the base ports 402 using cable adaptors 412. Heat shrink 414 is used to provide a watertight and dust-free seal between the output optical cable 410 and the cable adaptor 412. The output optical cable 410 and/or optical fibres contained therein are secured to one or more of the input ports 304 of the routing device 300. In this case, an adapter 418 is used to connect and secure the output optical cable 410 to the input port 304. The routing device 300 routes the optical fibres from output optical cable 410 through to its output port 310. According to the embodiment shown in FIG. 4b, the optical fibres are distributed onto ramp 122 and through a third portion of guide tracks 120c onto cable loop device 100, i.e. for storage or working in the fibre storage or work areas 102 or 106, respectively.

Once the optical cables 200 have been inserted into the optical joint 400 and have been looped within the cable storage area 110, a section of the outer sheath 202, as seen in FIG. 2b, of the optical cable 200 is removed to expose a portion of the optical fibres within. The removed section of the outer sheath of optical cable 200 is preferably located adjacent, i.e. proximate, to a second portion of guide tracks 120b of the cable loop device 100 to ensure the broken out optical fibres are routed to within the cable loop device 100 as directly as possible.

The cable loop devices 100 and/or routing devices 300 are mounted to device mount 408 by either a slide/snap fit joint or, if required, they can be more securely fastened by screws allowing greater strains to be sustained on the optical cables 200 and 410 and the cable and routing devices 100 and 300, respectively. In addition, to prevent possible strains on the optical cables 200 and 410 to be transmitted to the cable loop and routing devices 100 and 300, an adaptor 412 or strain connecters (not shown) or securing mechanisms (not shown) can be used to secure the optical cables 200 or 410 to the base 404 and base ports 402. In the embodiment shown in the figures, an adaptor 412 is used to connect the optical cable 410 to one of the base ports 402.

The optical joint 400 is weatherproofed by providing an optical joint cap or cover (not shown), which may be domed or shaped to accommodate the cable loop device 100 and routing device 300, a portion of optical cables 200 and 410, the optical fibres and any further component of the optical joint 400. The cover mates with the base 404 and base rim 406 of the optical joint 400. The cover encloses the components of the optical joint 400 and protects them from the external environment, particularly from water. The optical joint cover can be secured to the optical joint 400 by a securing mechanism, e.g. a screw thread, latches or clips and/or sealant. The optical joint 400 and/or cover can be further sealed with a waterproof sealant such as a silicon based sealant.

It can be noted that the optical cables 200 and 410—and the optical fibres contained therein—are controlled from the point of entry, i.e. from the base ports 402 and base 404, of the optical joint 400 up to the cable loop device 100 and/or the routing device 300. The cable loop device 100 is arranged within the optical joint 400 such that one or more optical cables 200 are looped, held and supported within cable storage area 110 until required. In addition, the optical cable 200 can enter and exit the optical joint 400 in a controlled fashion and the remaining optical fibres within the optical cable 200 can be used elsewhere within the optical network. The routing device 300 is arranged within the optical joint 400 such that the one or more optical cables 410 are held substantially straight between at least one of the input ports 304 of at least one of the arranged routing devices 300 and the base ports 402.

The optical cables 410 come up from the base 404 and are directed substantially straight into the input ports 304 of the routing device 300. Only a short length of transport tube (not shown) need to be used if an optical fibre is held substantially straight between the base ports 402 and the input ports 304. This ensures the optical fibres are kept substantially straight and not bent beyond their minimum bend radius.

The cable loop device 100 provides improved cable management of the optical cables through efficient use of available space (cable storage area 110) on the periphery of the cable loop device 100 for storing loops of optical cables 200. This further protects the optical fibres within the optical cable 200 from damage caused by intertwined optical cables and fibres or by bending the optical cables beyond their minimum bend radius as they are routed directly to the cable storage area 110 of the cable loop device 100 when installed within the optical joint 400.

The routing device 100 allows for improved cable management as the optical cables 410, transport tubes (not shown) and optical fibres (not shown) are controlled and directed through the optical joint 400. The result is a minimisation of optical cable/fibre congestion within the optical joint 400 and a lower probability of damaging the optical fibres during installation and maintenance.

In other variations of the muting device or cable loop device, one or more of the input ports or cable ports can be of a circular shape or elongated shape in which their diameters (or widths) are of a size that can grip a portion of the outer jacket of an optical cable or of a transport tube. The gripping of the optical cable/transport tube can be achieved by barbs facing inwardly towards the fibre guide tracks. Alternatively, ribs or spikes and the like can be used for gripping the optical cable/transport tubes.

In such embodiments, optical fibres can be routed within the routing device by initially splitting out the optical fibres from each optical cable. The length of optical fibre that is split out from the optical cable is determined by the length required to route and distribute the optical fibre from the muting device to elsewhere within the optical joint, i.e. to the cable loop device. A portion of the optical cable is inserted or plugged into one of the input ports. The input ports can be of a size and shape that grip the optical cable (this may involve squeezing the optical cable).

The invention is not limited to optical joints. In fact, the invention can apply to further optical fibre hardware systems, such as racks or cabinets. These can be enclosures for patch and/or splice panels. Splice panels connect individual fibres from cables and patch panels provide a centralised location for patching fibres, testing, monitoring and storing cables. Cable storage and management is required even in these enclosures to maximise the use of available storage space and minimise the congestion of, and likelihood of damage to, the optical cables and fibres stored, routed and spliced within.

The invention claimed is:

1. A cable loop device for use in optical systems, the cable loop device having a front side and a reverse side and comprising:
   at least one work area;
   at least one fibre storage area arranged on the front side;
   at least one cable storage area disposed on a periphery of the cable loop device; and
   a guide track configured to route at least one optical fibre between the front side and the reverse side.

2. The cable loop device of claim 1, wherein the at least one cable storage area is disposed around the periphery of the cable loop device.

3. The cable loop device of claim 1, wherein the at least one cable storage area comprises an inner periphery that encloses the at least one work area and the at least one fibre storage area.

4. The cable loop device of claim 3, wherein the inner periphery of the at least one cable storage area forms an inner guide rail.

5. The cable loop device of claim 3, wherein the inner periphery of the at least one cable storage area comprises a rim or a mandrel.

6. The cable loop device of claim 1, wherein at least one guide rail is arranged around an outer periphery of the at least one cable storage area.

7. The cable loop device of claim 6, wherein the at least one guide rail is provided with arcuately curved guide sections that are curved towards an inner periphery of the at least one cable storage area.

8. The cable loop device of claim 1, wherein at least one cable port is disposed through a periphery of the at least one cable storage area.

9. The cable loop device of claim 1, wherein the at least one cable storage area comprises a first set of holding portions spaced around the at least one cable storage area.

10. The cable loop device of claim 1, wherein an inner periphery of the at least one cable storage area comprises arcuately curved inner sections that are curved greater than a second predetermined minimum bend radius.

11. The cable loop device of claim 1, further comprising:
a cover to enclose the at least one fibre storage area and the at least one work area.

12. The cable loop device of claim 11, wherein the cover further encloses the at least one cable storage area.

13. The cable loop device of claim 1, further comprising:
a plurality of guide tracks;
wherein a first portion of the guide tracks connects between the at least one fibre storage area and the at least one work area.

14. The cable loop device of claim 13, further comprising:
a second portion of the guide tracks that connects the at least one cable storage area to the first portion of the guide tracks.

15. The cable loop device of claim 13, wherein the plurality of guide tracks comprises:
a second set of holding portions spaced along the guide tracks.

16. The cable loop device of claim 13, wherein the plurality of guide tracks comprises:
arcuately curved track sections that are curved greater than a first predetermined minimum bend radius.

17. The cable loop device of claim 13, wherein a third portion of the guide tracks connects to the first or second portion of the guide tracks, and is disposed through to an opposing side of the cable loop device as that of the at least one work area or the at least one fibre storage area.

18. The cable loop device of claim 17, wherein a routing device for use with the cable loop device comprises:
a plurality of input ports;
a plurality of fibre guide tracks, wherein the fibre guide tracks connect to at least one of the input ports;
one or more output guide tracks, wherein at least two of the fibre guide tracks merge into at least one of the one or more output guide tracks; and
mounting means for mounting the routing device to the cable loop device such that at least one of the one or more output guide tracks mates with at least the third portion of the guide tracks.

19. The cable loop device of claim 18, wherein at least one of the one or more output guide tracks mates with at least one end of the third portion of the guide tracks, and
wherein the at least one end is not connected to the first or second portion of the guide tracks.

20. The cable loop device of claim 18, wherein the mounting means comprises at least one mating recess configured to mate at least one of the one or more output guide tracks with at least the third portion of the guide tracks.

21. The cable loop device of claim 18, wherein the plurality of input ports are spaced apart and a portion of the input ports are arranged in line with at least one of the fibre guide tracks.

22. The cable loop device of claim 18, wherein the fibre guide tracks comprise a third set of holding portions spaced apart on at least one top edge of the fibre guide tracks.

23. The cable loop device of claim 1, wherein the at least one work area is a splicing area of optical fibres.

24. The cable loop device of claim 1, wherein the at least one work area comprises splice bays.

25. An optical joint for use in optical systems, the optical joint comprising:
one or more base ports that are disposed through a base of the optical joint; and
at least one cable loop device of claim 1 mounted within the optical joint.

26. The optical joint of claim 25, further comprising:
a cap that is secured to the optical joint to enclose components of the optical joint.

27. A method of using the cable loop device of claim 1 with at least one optical cable, wherein the at least one optical cable comprises at least one optical fibre, the method comprising:
looping a first optical cable around the at least one cable storage area;
selecting one or more sections of the first optical cable for removal;
removing the one or more sections of the first optical cable to expose the at least one optical fibre;
breaking out the at least one optical fibre from the first optical cable; and
guiding the at least one optical fibre through to within the at least one work area or the at least one fibre storage area of the cable loop device.

28. The method of claim 27, further comprising:
mounting a routing device to the cable loop device;
securing a second optical cable to the routing device;
removing one or more optical fibres from the second optical cable; and
guiding at least one of the one or more optical fibres of the second optical cable through one or more fibre guide tracks of the routing device to an output port of the routing device for further distribution;
wherein the routing device comprises:
a plurality of input ports;
a plurality of fibre guide tracks, wherein the fibre guide tracks connect to at least one of the input ports;
one or more output guide tracks, wherein at least two of the fibre guide tracks merge into at least one of the one or more output guide tracks; and
mounting means for mounting the routing device to the cable loop device such that at least one of the one or more output guide tracks mates with at least a third portion of the guide tracks.

29. The method of claim 28, further comprising:
guiding at least one of the one or more optical fibres of the second optical cable from the output port of the routing device to the at least one work area or the at least one fibre storage areas of the cable loop device.

30. The method of claim 28, further comprising:
working at least one of the one or more optical fibres of the second optical cable with the at least one optical fibre from the first optical cable.

31. The method of claim 28, further comprising:
storing at least one of the one or more optical fibres of the second optical cable within the at least one fibre storage area.

32. The method of claim 27, wherein looping the first optical cable comprises:
looping the first optical cable around an inner periphery of the at least one cable storage area.

33. The method of claim 27, wherein looping the first optical cable comprises:
guiding a remaining length of the first optical cable from the cable loop device.

34. The method of claim 27, wherein selecting the one or more sections of the first optical cable comprises:
selecting a position of at least one of the one or more sections of the first optical cable in proximity to at least one of the second guide track.

35. An optical network, comprising:
one or more optical cables; and
at least one optical joint;
wherein the at least one optical joint comprises:
one or more base ports that are disposed through a base of the at least one optical joint; and
at least one cable loop device mounted within the at least one optical joint;
wherein the at least one cable loop device has a front side and a reverse side and comprises:
at least one work area;
at least one fibre storage area arranged on the front side;
at least one cable storage area disposed on a periphery of the at least one cable loop device; and
a guide track configured to route at least one optical fibre between the front side and the reverse side; and
wherein at least one of the one or more optical cables enters at least one of the one or more base ports of the at least one optical joint and enters the at least one cable storage area of the at least one cable loop device.

36. The optical network of claim 35, wherein a remaining length of the one or more optical cables that have entered the at least one cable storage area exit the at least one cable storage area.

37. The optical network of claim 36, wherein the remaining length of the one or more optical cable exits through the at least one of the one or more base ports of the optical joint.

38. The optical network of claim 35, wherein a section of the one or more optical cables within the at least one cable storage area is removed and at least one optical fibre is guided through a second portion of the guide track.

39. The optical network of claim 38, wherein a remaining portion of at least one optical fibre is left within a remaining length of the one or more optical cables.

* * * * *

UNITED STATES PATENT AND TRADEMARK OFFICE
CERTIFICATE OF CORRECTION

| | | |
|---|---|---|
| PATENT NO. | : 8,472,772 B2 | Page 1 of 1 |
| APPLICATION NO. | : 12/308643 | |
| DATED | : June 25, 2013 | |
| INVENTOR(S) | : Griffiths et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this
Twenty-fourth Day of March, 2015

Michelle K. Lee
*Director of the United States Patent and Trademark Office*